United States Patent

Fischer et al.

(10) Patent No.: US 10,416,969 B2
(45) Date of Patent: *Sep. 17, 2019

(54) SYSTEM FOR THE DISCOVERY AND PROVISIONING OF ARTIFACTS AND COMPOSITES

(71) Applicant: International Business Machines Corporation, Armonk, NY (US)

(72) Inventors: Peter Fischer, Filderstadt-Bonlanden (DE); Oliver Koeth, Stuttgart (DE); Hendrik Haddorp, Holzgerlingen (DE); Andreas Nauerz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/356,651

(22) Filed: Nov. 20, 2016

(65) Prior Publication Data

US 2017/0206066 A1      Jul. 20, 2017

Related U.S. Application Data

(63) Continuation of application No. 12/142,952, filed on Jun. 20, 2008, now Pat. No. 9,513,881.

(30) Foreign Application Priority Data

Jun. 27, 2007    (EP) ...................................... 07111107

(51) Int. Cl.
*G06F 8/36*     (2018.01)
*G06F 8/60*     (2018.01)
*G06F 9/44*     (2018.01)

(52) U.S. Cl.
CPC . *G06F 8/36* (2013.01); *G06F 8/60* (2013.01)

(58) Field of Classification Search
CPC ..................................... G06F 8/36; G06F 8/60
USPC ......................................................... 717/177
See application file for complete search history.

(56) References Cited

U.S. PATENT DOCUMENTS

| 6,286,047 B1 * | 9/2001 | Ramanathan ..... H04L 29/12066 370/229 |
| 6,336,138 B1 * | 1/2002 | Caswell .................. H04L 41/12 345/440 |
| 7,653,902 B2 * | 1/2010 | Bozak ....................... G06F 8/61 717/103 |
| 7,774,791 B1 | 8/2010 | Appelbaum et al. |

(Continued)

*Primary Examiner* — Ryan D. Coyer
(74) *Attorney, Agent, or Firm* — Steven M. Greenberg, Esq.; Shutts & Bowen LLP

(57) ABSTRACT

A system for automatically assisted generation of composite applications composed of instantiable components performs the steps of:
a) dynamically accessing a data source of one or more components being potentially suitable for being used within the composite application,
b) parsing the data source for a predetermined searched component according to a predetermined functionality specification standard,
c) ranking found components according to predetermined ranking criteria,
d) defining a list of selected usable components from the ranking,
e) storing at least a subset of the selected components locally, and
f) automatically deploying the composite application from the selected components.

7 Claims, 15 Drawing Sheets

(56) References Cited

U.S. PATENT DOCUMENTS

Figure 1A:
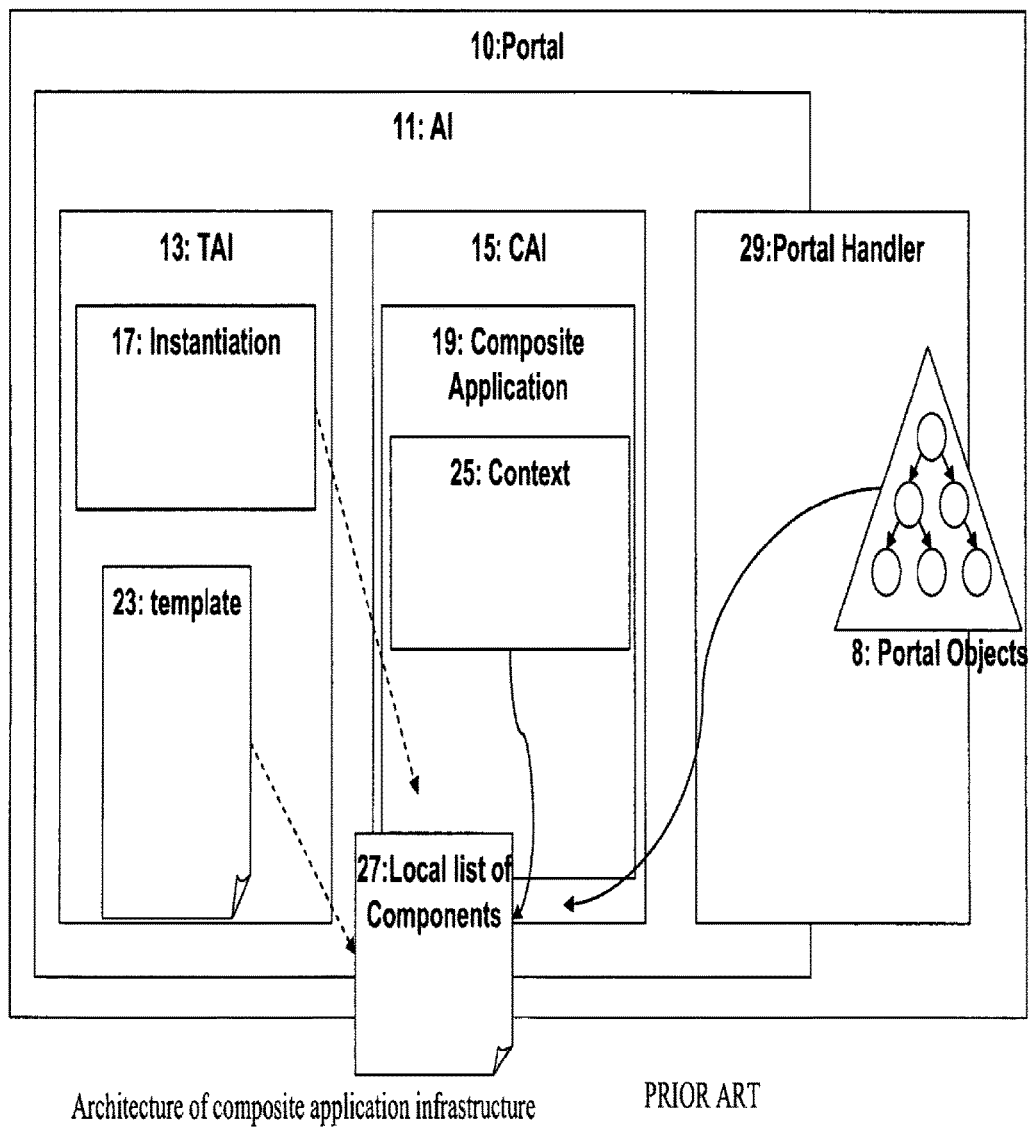

| | | | |
|---|---|---|---|
| 7,802,247 B1* | 9/2010 | Weathersby | G06F 8/65 717/174 |
| 2005/0144226 A1* | 6/2005 | Purewal | G06F 8/36 709/203 |
| 2005/0268280 A1 | 12/2005 | Fildebrandt | |
| 2006/0015806 A1* | 1/2006 | Wallace | G06F 17/246 715/229 |
| 2006/0036993 A1 | 2/2006 | Buehler et al. | |
| 2006/0150178 A1* | 7/2006 | Jerrard-Dunne | G06F 8/71 717/168 |
| 2007/0067373 A1 | 3/2007 | Higgins et al. | |
| 2007/0150478 A1* | 6/2007 | Cho | H04L 29/12113 707/999.01 |
| 2007/0265814 A1* | 11/2007 | Moore | G06F 8/10 703/10 |
| 2008/0033785 A1* | 2/2008 | Anke | G06F 9/5027 705/7.26 |
| 2008/0306798 A1* | 12/2008 | Anke | G06F 8/61 705/7.26 |

* cited by examiner

Architecture of composite application infrastructure

Architecture of composite application infrastructure

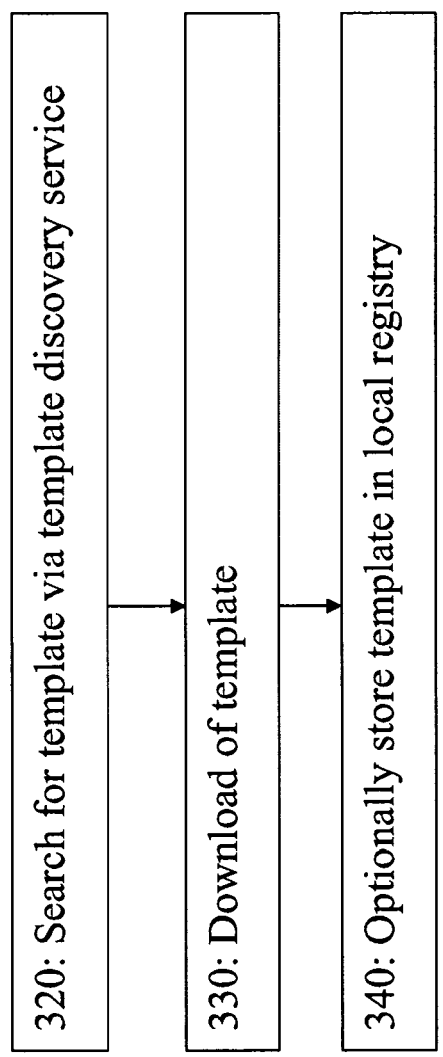

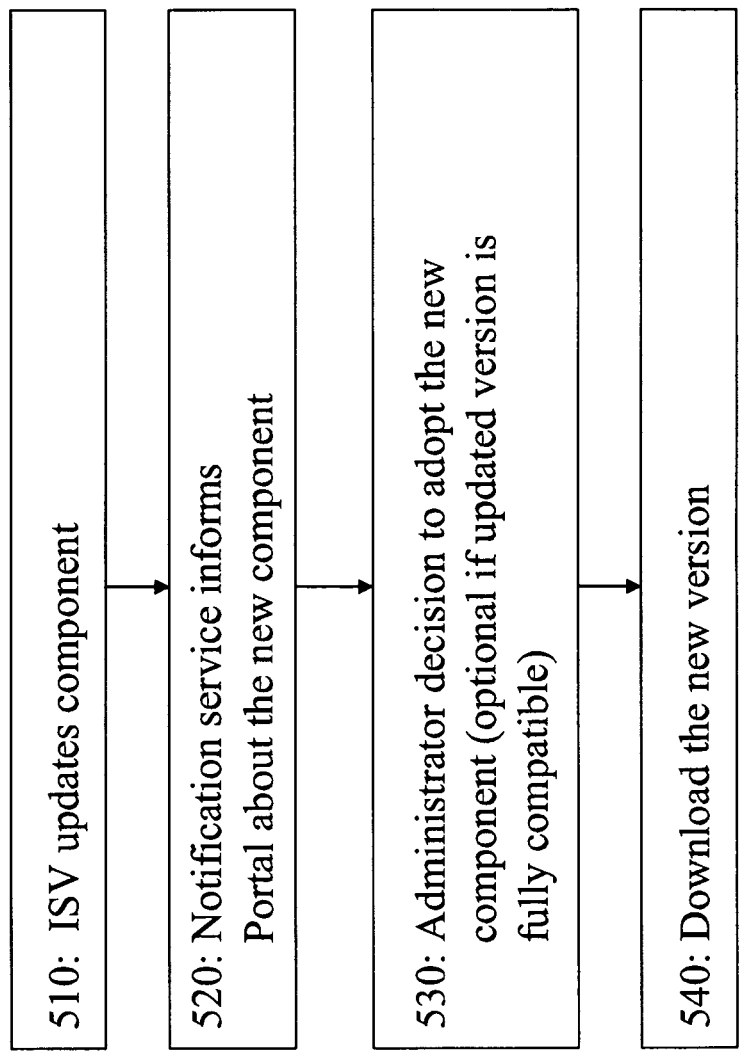

Sample component meta-data
- A mail component

```
<mail:mail xmlns:mail="http://...">
  <protocolls>
    <protocoll>SMTP</protocoll>
    <protocoll>POP3</protocoll>
  </protocolls>
  <directory>LDAP</directory>
</mail:mail>
```

- A calendar component

```
<calendar:calendar xmlns:calendar="http://...">
  <protocolls>
    <protocoll>iCal</protocoll>
  </protocolls>
  <directory>LDAP</directory>
</calendar:calendar>
```

- A document library component

```
<docliboclib xmlnsoclib="http://...">
  <size>
    <min>10</min>
    <max>100</max>
  </size>
  <structure>
    <folder>
      <depth>
        <min>100</min>
      </depth>
    </folder>
  </structure>
</docliboclib>
```

FIG. 8

SYSTEM FOR THE DISCOVERY AND PROVISIONING OF ARTIFACTS AND COMPOSITES

CROSS-REFERENCE TO RELATED APPLICATION

This application is a Continuation of U.S. application No. 12/142,952, filed Jun. 20, 2008, which claims priority to European Patent Application No. 07111107.4, filed Jun. 27, 2007, both of which are incorporated herein by reference in their entirety.

1. BACKGROUND OF THE INVENTION

1.1. Field of the Invention

The present invention relates to software development in a networked environment. In particular, it relates to a method and system for automatically assisted generation of composite applications which are composed of a plurality of components, and in which method a template means defines the requirements and specifications of the components of the composite application, and wherein the template serves as an input for instantiating the composite application.

1.2. Description and Disadvantages of Prior Art

In this field the term "composite application" defines an application hosted on a web portal platform which is built by combining and connecting multiple components such as portlets, wikis, document libraries or web services, for a particular purpose such as a shop or a virtual teamroom application. A single portal platform may host multiple instances of the same composite application, for example different teamrooms for different associated user communities. Composite applications are built from a template describing the contained components and their set-up and interconnection.

FIG. 1 illustrates a prior art system architecture which is used in prior art for building a composite application.

FIG. 1A shows the overview of the components that build up the prior art application infrastructure 11,—abbreviated herein also as AI—system architecture within an overall portal system 10. The application infrastructure comprises:
  the templating application infrastructure 13—abbreviated herein also as TAI—that handles the templates in the system and the creation of new composite applications,
  the composite application infrastructure 15—abbreviated herein also as CAI—that handles the application instances 19 during runtime and manages connections and the data flow between the components of an application,
  the component registry 27 that manages the business components installed in the system, and
  the portal handler 29 which is a specific local component that manages any portal related artifacts 8 like pages or portlets for the application infrastructure in the portal, and which is used by the instantiation component 17 to create such artifacts during the creation of a new composite application.

The templating application infrastructure (TAI) component 13 manages the templates 23 in the system which contain references to instantiable components in a local list of components 27. As an example, a template for shopping applications could consist of a reference to a document library component which is used to hold the available goods and their descriptions, a shop portlet that lets clients process actual shopping transactions, an invoice business component that handles the payment process and a blogging component that allows clients to comment on their satisfaction.

The TAI component 13 also creates application instances from the templates via an instantiation component 17, which creates separate instances of the referenced business components, typically by creating or copying individual configurations for these components such that multiple application instances can be created from the same template without interfering with each other.

For the above mentioned sample template, the instantiation 17 would, among other things, create an individual storage compartment in the document library, an individual configuration of the invoice component referring to the bank account and an individual configuration for the shop portlet that is set up to display goods from the created document library and to delegate payment processing to the created invoice component instance. In particular, the instantiation 17 needs to create the necessary portal artifacts like pages that allow to interact with the created composite application, which is typically done by employing a specific handler 29 that creates those portal artifacts 8 and links them with the business components of the application.

Figure 1B:
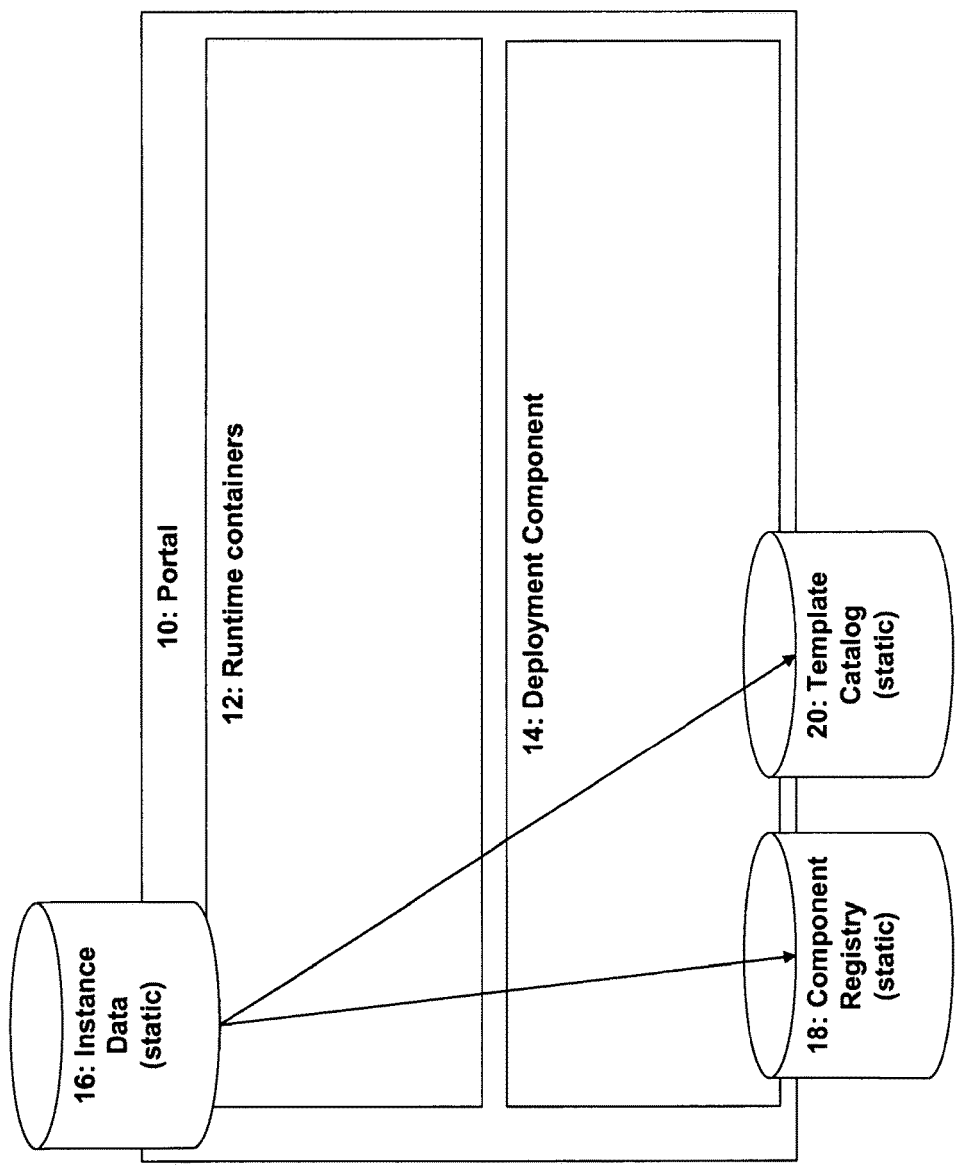

The created composite application instances 19 hold a context 25 that lists the component instances that make up the composite application FIG. 1B shows an overview of the storage components involved in the portal architecture 10 that comprises deployment related code in a deployment component 14 and a runtime environment in one or more runtime containers 12 where the deployed components are executed.

For the composite application context deployed artifacts are:
  application components stored in a component registry 18,
  templates stored in a template catalog 20.

This data is then referenced by the application's instance specific data 16.

In prior art composite applications and their components which are also referred herein as "artifacts" have to be individually developed or supplied by a vendor. Specifically, when different composite applications or artifacts are offered by different vendors a decision which composite application or artifact to use for building up a new, own composite application requires significant knowledge about the properties of the artifacts offered by the various vendors. These properties comprise the scope of functions, an artifact is able to deliver, compliant of input data and output data in order to build in an artifact into the planned own composite application, as well as precise descriptions of APIs to other artifacts or components cooperating with. This is the reason why such artifacts need to be manually observed, analyzed and finally deployed. Further, a planned composite application needs then to be manually assembled by using the artifact mentioned above. The assembly can then be stored as a template.

Alternatively, composite applications can also be created based on templates that contain the list of components that build up the composite application. If any of the respective components is not available in the system the creation of the composite application will fail. So, always, some manual work is necessary for creating a composite application.

Disadvantageously, this manual work requires much skills and experience. Further, in case of updates for certain artifacts which have been used for building up the composite applications it is a difficult work to observe and analyze if such new update is suitable for being build in an existing composite application in order to replace an older version thereof. Again, the functional scope must be analyzed, the interfaces must be observed in order to comply with those being used in the actually existing composite application and, potentially, a decision has to be taken if or if not to extend the composite application in order to integrate some new function offered by such new update of an artifact as mentioned above.

Disadvantageously, the assembly and keeping up-to-date of such composite applications is to much time-consuming.

1.3. Objectives of the Invention

It is thus the objective of the present invention to provide a method for automatically assisted generation of composite applications which is more flexible and requires less skill and time for building a composite application or for keeping it up-to-date.

2. SUMMARY AND ADVANTAGES OF THE INVENTION

In short words, the inventional method discloses two processing parts: A first part for implementing a dynamic discovery and deployment of components referenced by a template, and a second part for performing an automated assembly of components based on meta data, e.g., a component to store documents, and a component to handle mail.

The above objective of the invention is achieved by the features stated in enclosed independent claims. Further advantageous arrangements and embodiments of the invention are set forth in the respective subclaims. Reference should now be made to the appended claims.

According to its basic aspect the present invention discloses a method for automatically assisted generation of composite applications preferably implemented in an application server, or specifically in a portal server, which composite applications are composed of a plurality of instantiable components, wherein a composite application infrastructure (CAI) component handles application instances during runtime and manages connections and data flow between said components of a composite application, and wherein a templating application infrastructure (TAI) component manages templates (23) which contain references to said instantiable components. This method is characterised by an automatic component discovery comprising the steps of:

a) dynamically accessing a data source such as e.g. a template catalog, an artefact registry, or some libraries located locally or remote in a network, which data source comprises one or more components, being potentially suitable for being used within the composite application,
b) parsing the data source for a predetermined, searched component according to a predetermined functionality specification standard, as exemplarily given in FIG. 8,
c) ranking found components according to predetermined ranking criteria,
d) defining a list of selected usable components from the ranking,
e) storing at least a subset of the selected components locally, preferably at the application server,
f) automatically deploying the composite application using at least one of said selected components.

The step of discovering components may include the access of data sources located local or remote relative to the server which generates the composite application.

Further the process of installing a discovered component into said composite application may be done advantageously in an automated way without major human interference.

Further advantageously, an automatic versioning management may be included by enriching the inventional method, wherein a component is used for an instantiation of a composite application is automatically monitored for updates thereof, and wherein in case a new update is discovered, the step is performed of checking if its requirements comply with those of the composite application, and, if it complies, to perform the step of automatically binding the new updated component into the composite application.

3. BRIEF DESCRIPTION OF THE DRAWINGS

Figure 2A:
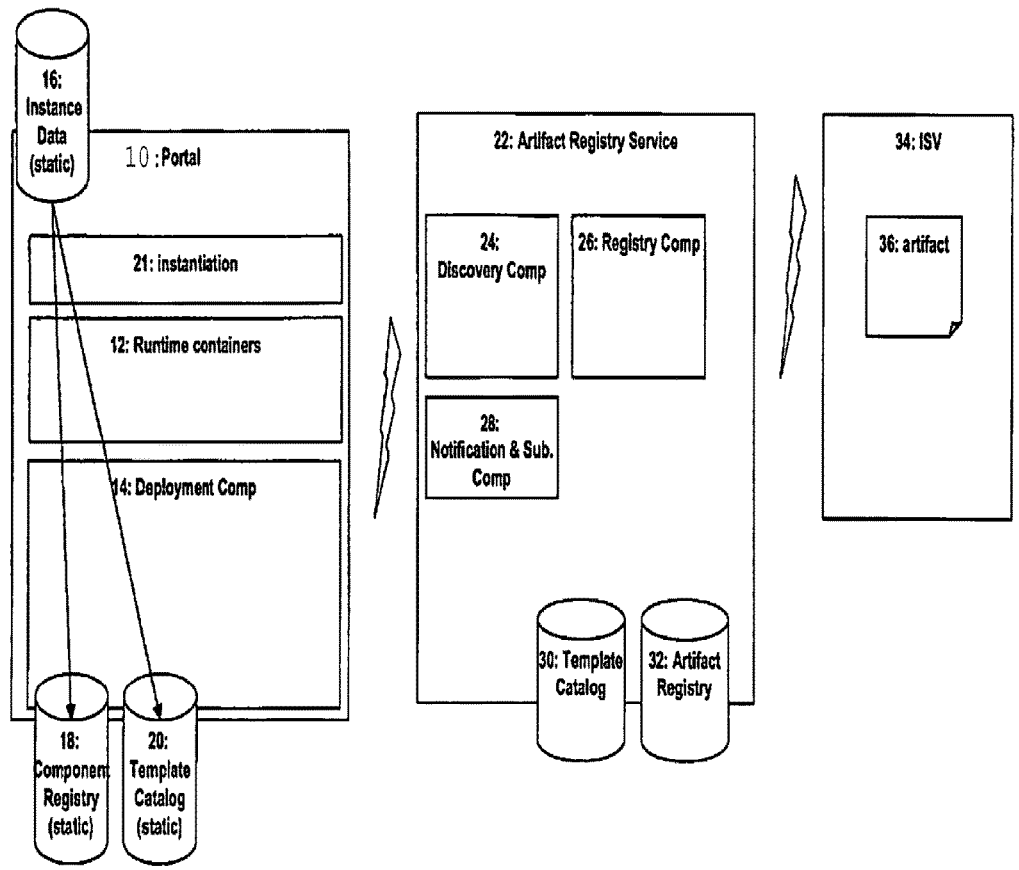
Figure 2B:
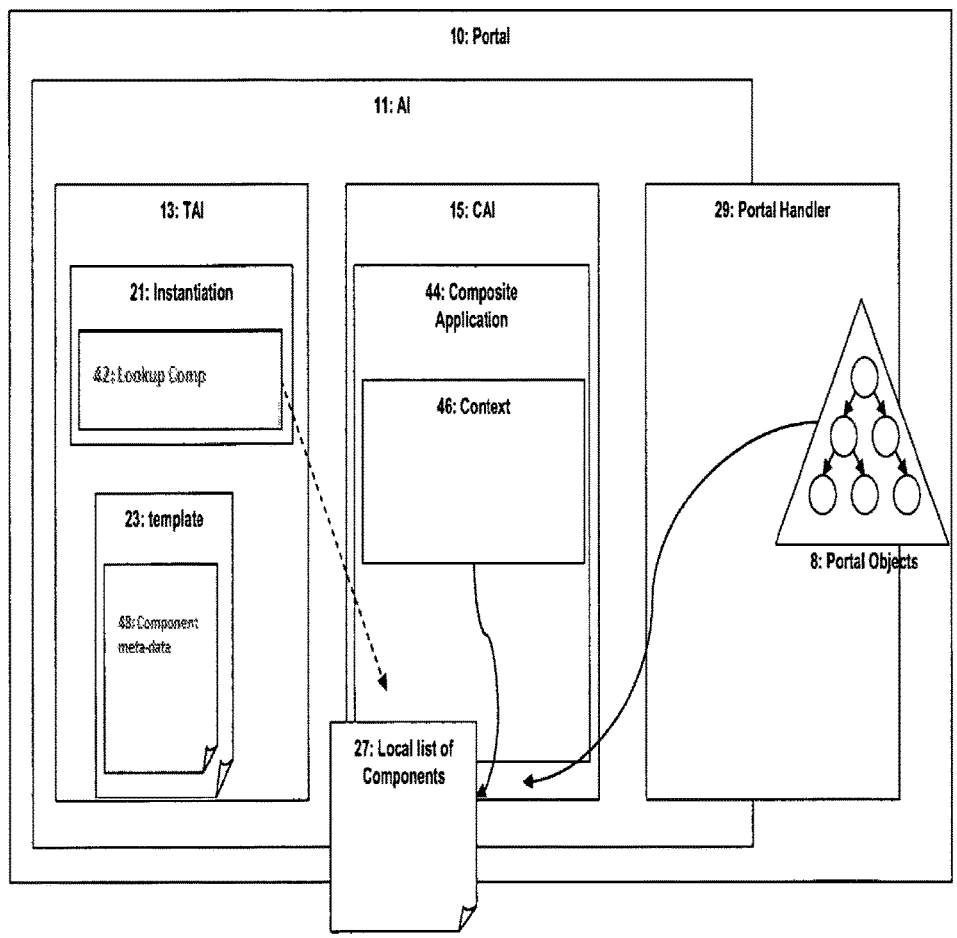
Figure 3B:
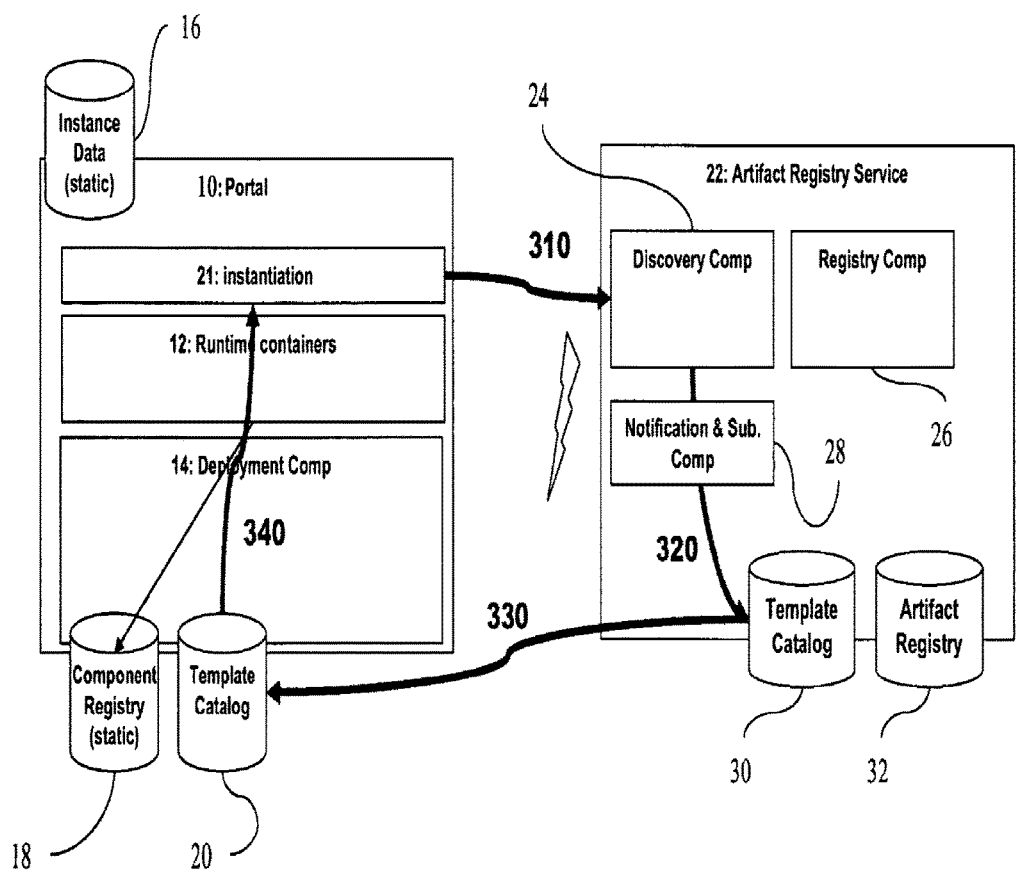
Figure 4A:
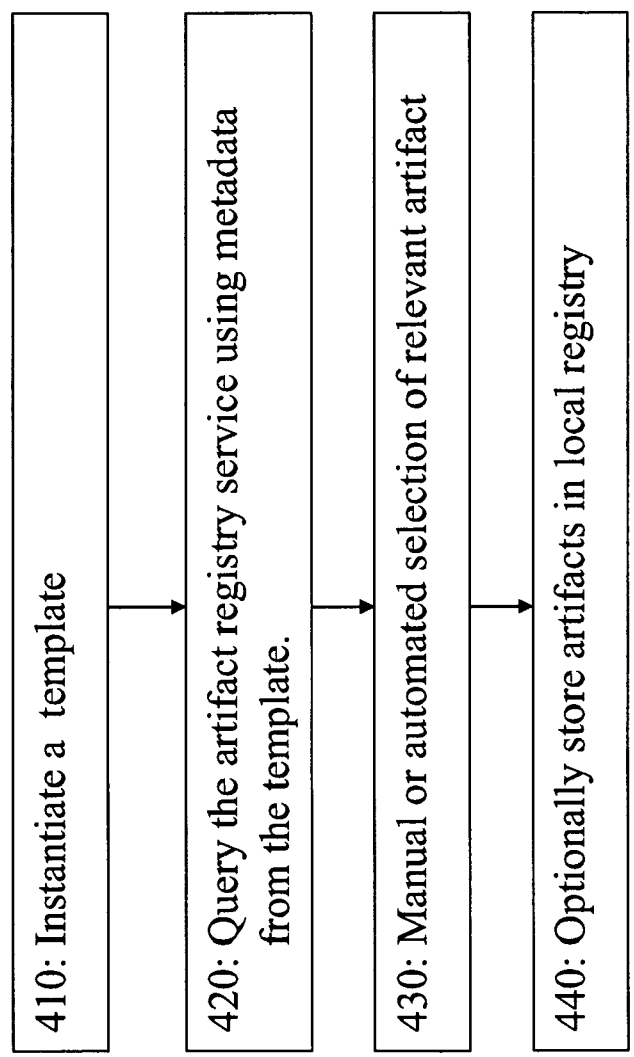
Figure 4B:
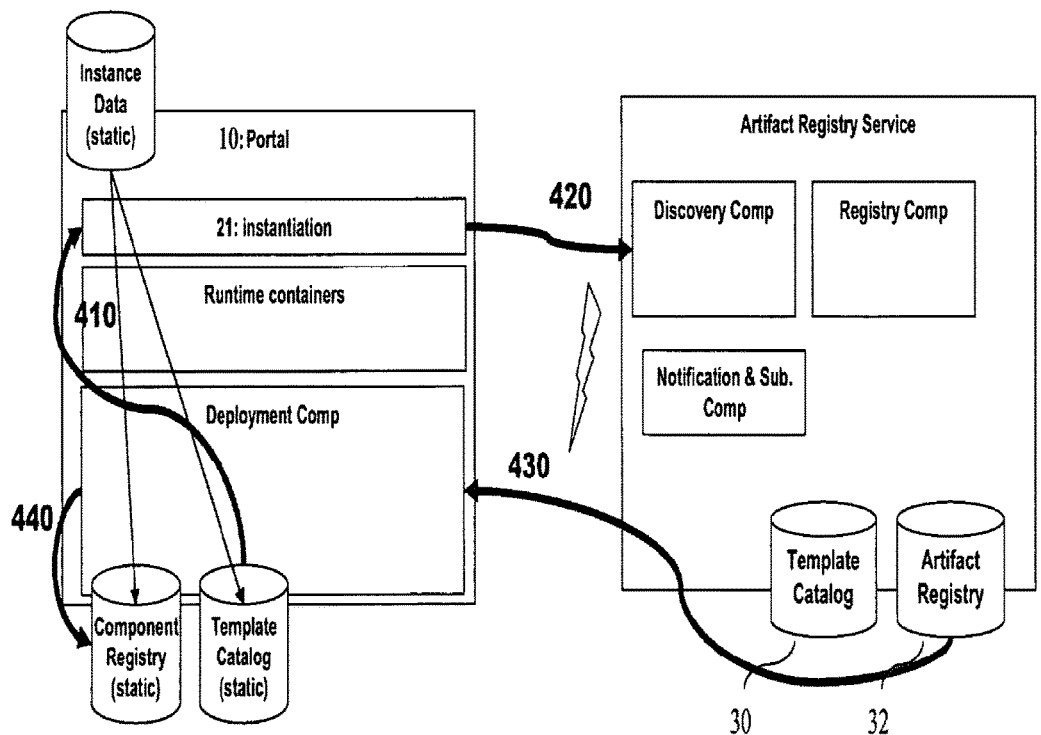
Figure 5B:
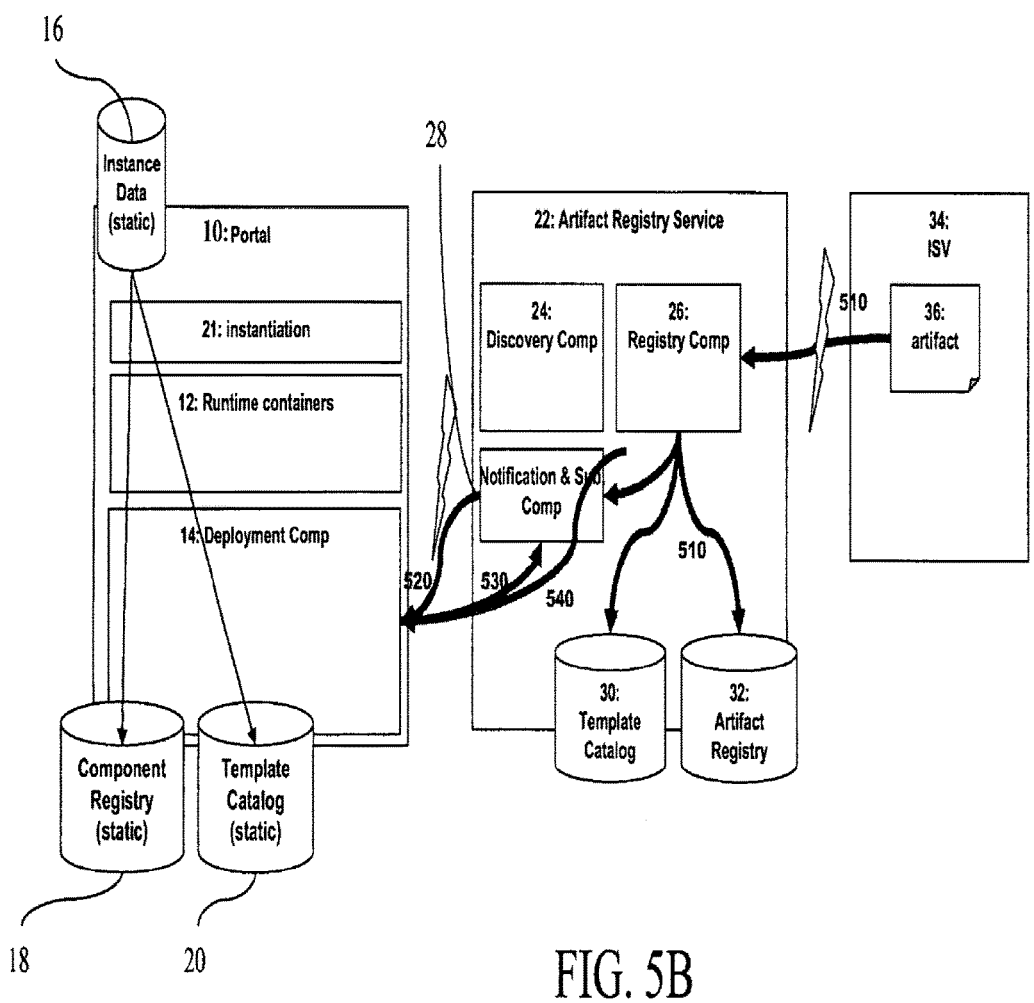
Figure 6A:
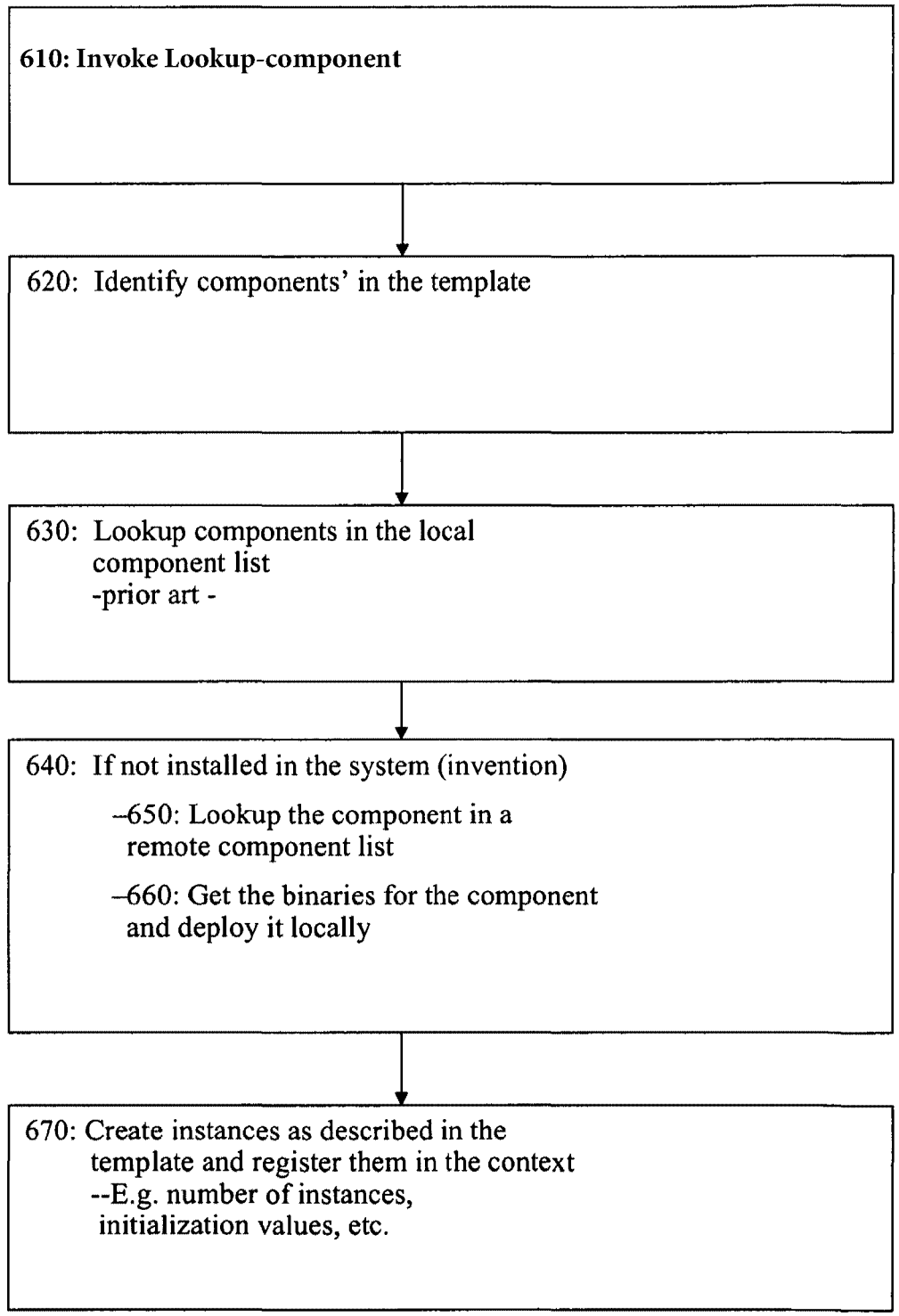
Figure 6B:
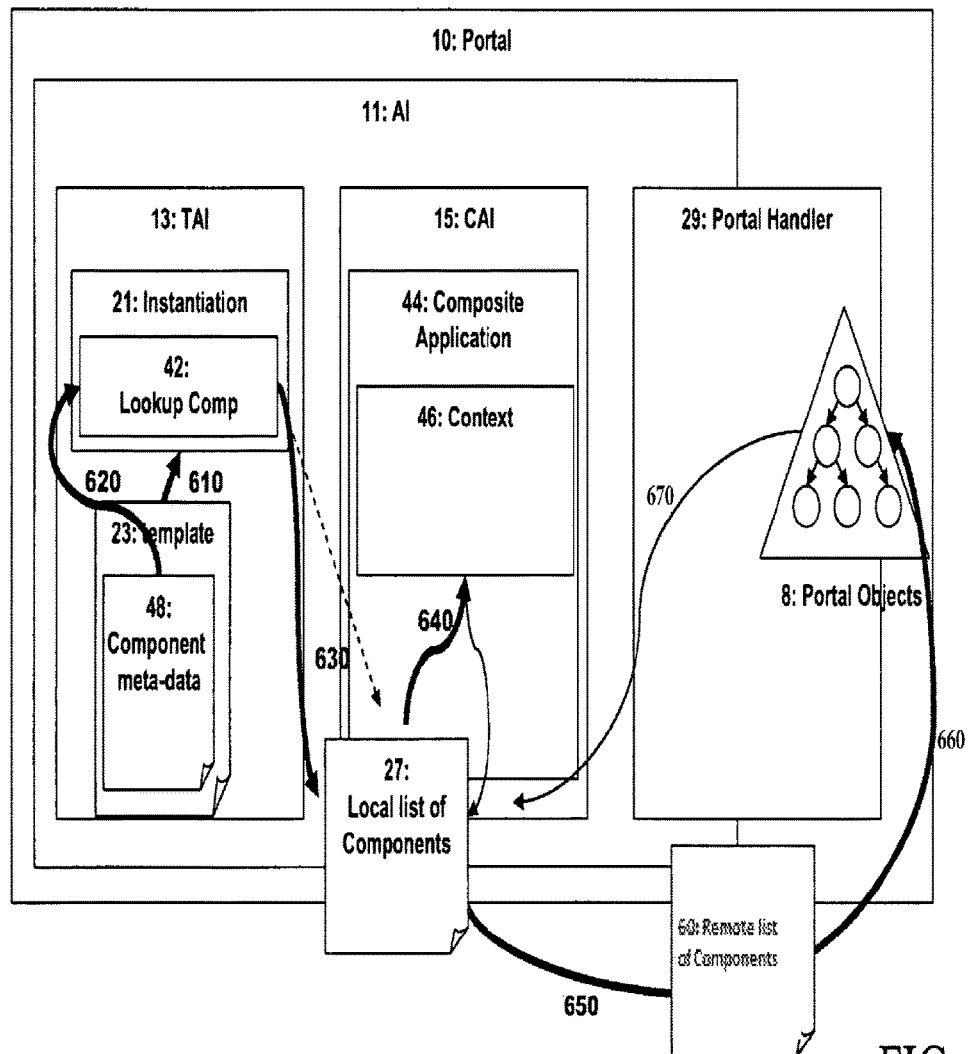
Figure 7A:
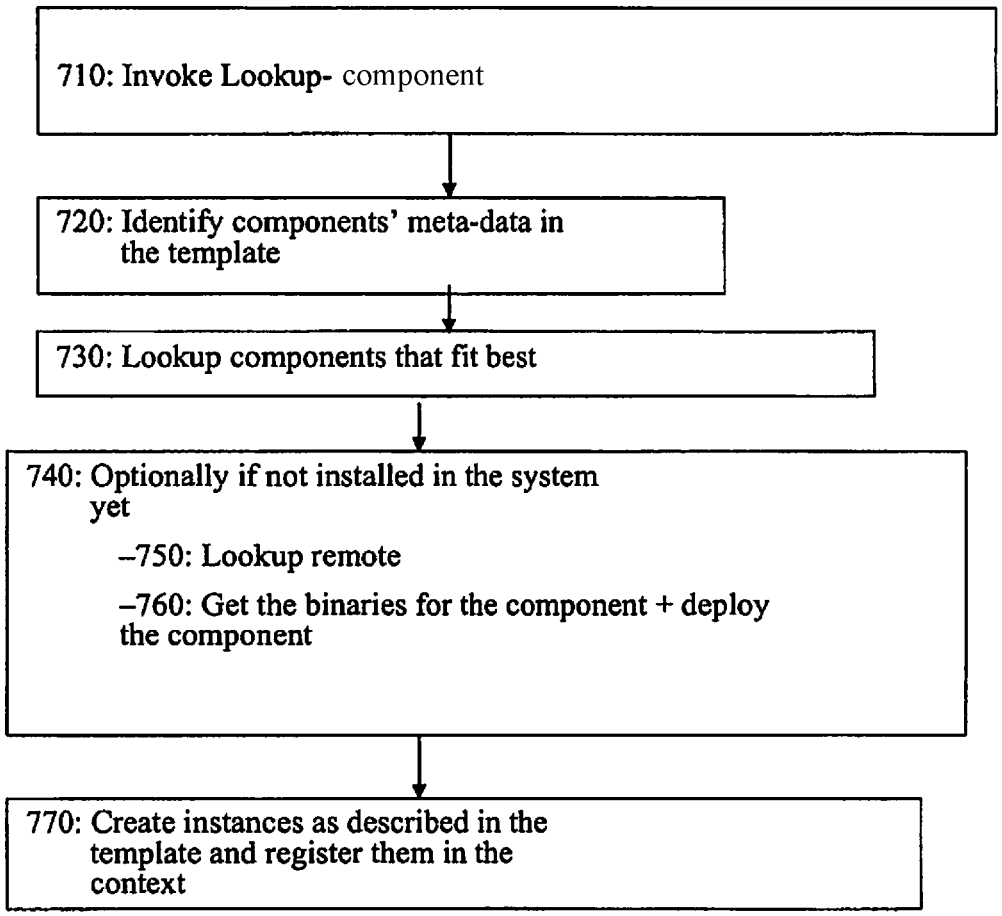
Figure 7B:
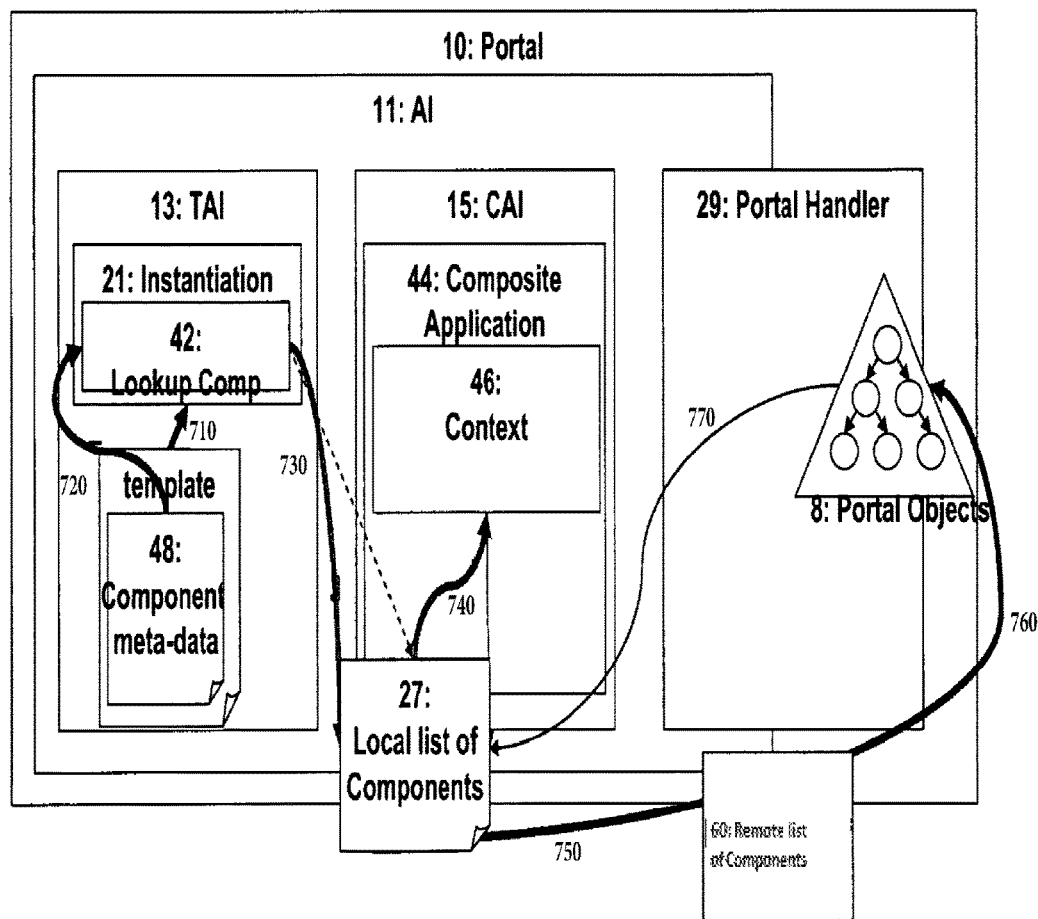

The present invention is illustrated by way of example and is not limited by the shape of the figures of the drawings in which:

FIG. 1A and 1B illustrate the most basic structural components of a prior art hardware and software environment used for a prior art method at a portal site, FIG. 2A and 2B illustrate the most basic structural components of a inventional hardware and software environment used for a preferred embodiment of the inventional method again at a portal site, FIG. 3A and 3B illustrate the control flow of the most important steps of a preferred embodiment of the inventional method, when searching for a template, FIG. 4A and 4B illustrate the control flow of the most important steps of a preferred embodiment of the inventional method, when searching for artefacts using meta data from a template described with reference to FIG. 3, FIG. 5A and 5B illustrate the control flow of the most important steps of a preferred embodiment of the inventional method, when managing updates of artefacts discovered according to FIG. 4 incorporated in a composite application based on a template described with reference to FIG. 3, FIG. 6A and 6B illustrate the control flow of the most important steps of a preferred embodiment of the inventional method, when automatically creating an instance of a composite application using artefacts discovered according to FIG. 4, FIGS. 7A and 7B illustrate a further modification of the before described method. The basic procedure is the same as described before with reference to 6A and 6B. For example as illustrated in step 710, an invocation of the look up component from a template occurs.

FIG. 8 shows some details for sample component meta data.

4. DETAILED DESCRIPTION OF THE PREFERRED EMBODIMENT

FIG. 2A illustrates the system architecture used in a preferred embodiment of the present invention, distributed over a network, such as the internet. FIG. 2B shows details at the portal site.

In the portal system 10 (left part of FIG. 2A) a new component 21 is implemented: An instantiation component 21. This instantiation component 21 has appropriate interfaces to the portal 10, to the runtime container 12, the deployment component 14 as well as to input/output and send/receive functionalities in order to communicate across the internet or another network with an artifact registry service 22, which is in turn also new and provided by the present invention.

In the artifact registry service 22 a further discovery component 24 is provided, as well as a registry component 26 and a notification component 28. Further, the before mentioned components have appropriate APIs in order to communicate with each other and with a template catalogue 30 as well as with an artifact registry 32. Further, send and receive functionality is provided and not explicitly depicted in order to communicate with either the portal 10 or any independent software vendor 34 (ISV) depicted in the right hand portion of FIG. 2.

The independent software vendor 34 may be represented for example by a portal or by any other suited data source which includes one or a plurality of artifact 36 which are collected in the artifact registry 32 of the respective service 22. It should be noted that a plurality of independent software vendors 34 register their respective artifact 36 in this artifact registry 32 such that there is built up a considerable collection of such artifacts. In a preferred embodiment of the present invention the artifacts are ordered by incorporating them into a given taxonomy which is preinstalled at the artifact registry 32.

In a similar way a template catalogue 30 is provided at the artifact registry service 22 which comprises a collection of templates, also preferably ordered by a given taxonomy, wherein each template is usable by the inventional method in order to generate a composite application by using one or more of such templates as a base for the structure and function of such composite application.

The discovery component 24 is preferably invoked by the instantiation component 21, as the components are needed for instantiating the composite application, and searches artifacts and templates based on meta-data supplied with the invocation. A further example illustrating a more detailed description of the discovery component and its cooperation with the registry component 26 and the notification and subscription component 28 is given further below.

The registry component 26 provides the following basic functionality:

The registry component 26 allows Independent Software Vendors 34 to deploy their templates and artifacts into the Artifact Registry Service 22. This component 26 is responsible to store the templates, artifacts and their metadata in the Template Catalog 30 and Artifact Registry 32.

The notification and subscription component 28 implements some logic which alerts about available artifact updates which can then be provided automatically to the instantiation component 21 of the portal 10. Alternatively or in combination, specific versions of artifacts or composite applications can be selected manually after being offered for instantiation by this component 28.

With further reference to FIG. 2B the template is enhanced by a meta data collection 48 to contain meta-data about components instead of directly listing the components that shall be used.

When a template is instantiated, the lookup component 42 interprets the component description and searches for suitable components in the local list 27 of components and by using the discovery component 24.

The independent software vendor 34 is assumed now to upload, store and register the templates and artefacts he is offering for purchase and use by others. The storage location in this example is the template catalogue 30 and the artefact registry 32, see FIG. 2A.

With further reference to FIGS. 3A, 3B, and 4A, 4B, as well as FIG. 5A, 5B some control flow diagrams (A) and interaction charts (B) are discussed which illustrate important steps of the inventional method.

With reference to FIG. 3A and 3B, respectively, after invocation 310, in a step 320 the discovery component 24 searches for a template via a dedicated template discovery service. This is done in order to build up a new composite application as it was mentioned further above according to the objective of the present invention. More details are given further below describing according to which preferred aspects such search step 320 is implemented.

Once a template has been found by the search step 320 this template will be downloaded to the portal 10, to the instantiation component 21 thereof, in a step 330. Of course, more than only one template can be downloaded in particular in a situation in which several templates are stored in the template catalogue 30 which fulfill basically the same technical functionality. It should be mentioned that preferably also further business meta information such as apprise to use such template may be recorded at the template catalogue. Of course, this additional information will be also downloaded to the instantiation component 21.

At the portal site the instantiation component first stores the downloaded templates in a local template registry, as it is known from the template catalogue 20 in FIG. 1.

With further reference to FIG. 4A and 4B the instantiation of a template and the query of artifacts are described in more detail:

In a first step 410 one of the templates which were downloaded in step 330 or which have been stored in the local template registry 340 is selected for instantiation.

In order to make a good selection, a plurality of criteria may be set up and offered to be controlled by an administration user or by a business user which may use a man machine interface which is smart enough to hide technical details and to stress business details which may be understood by such business user the composite application is deemed to cover. Examples for criteria are the following: Scope of functionality, price, quality of service, availability of service, etc.

In a further step 420 the artifact registry 32 is queried by the instantiation component 21 by using meta data from the selected template. The meta-data includes version compatibility and dependency information to determine a matching set of compatible artifacts. Examples for such meta data are given and described in FIG. 8 later below. An example is:
/mail/protocolls[protocoll=POP3]
/mail/protocolls[protocoll=IMAP]

By that a mail component which is POP3 compliant, or IMAP compliant, respectively, is searchable.

The result of step 420 is a set of artifacts which all fulfill more or less well the requirement of the query. The skilled reader will understand that the evaluation of the query result is implemented in an application-driven way in order to give more or less freedom to tailor the composite application according to any specific business requirements.

Then, in a further step 430 the one or more missing artifacts are downloaded to the instantiation component 21 of the portal 10. There, they are preferably stored locally in the local component registry 18, or, alternatively, in a separate registry, step 440.

Then, all components required to build up a new composite application should be available local at the portal 10 and ready to be accessed by the instantiation component 21. According to the present invention the composite application is now automatically deployed from the selected components. Similar to the selection of templates also the selection of artifacts may be performed preferably according to any given ranking criteria which are predetermined in any way and adjusted to a respective individual composite application. Similar criteria as mentioned above can be taken also here. So, in the end a new composite application has been generated and can be instantiated by the instantiation component 21. So, this new composite application may be used for the real business of a respective enterprise.

In the course of time, however some of the components or templates which are used for one or more composite applications are no more up-to-date because there may be a newer version of such component or artifact offered by its producer.

According to a further preferred feature of the present invention which may be used to enrich the inventional method such update components may be either automatically incorporated into an existing composite application or may at least the automatically offered for manual inclusion into such composite application. In the letter case a business user or a business user accompanied by a programmer may decide on this.

FIG. 5A and 5B show the basic control flow of such update:

In a first step 510 the independent software vendor 34 updates any given predetermined component which is assumed now to be in use in a certain composite application. Thus, such updated component is send to the artifact registry service 22 and will be stored in the artifact registry 32. Here, a trigger is fired in order to invoke the notification component 28. The notification component 28 identifies the artifact, new version number, and optionally a catalogue of new functions which the new update artifact offers to the business user. The notification component 28 further stores in a dedicated mapping list an association between each artifact, its version number and each composite application which makes use of such artifact. In order to do that, preferably a database is used which stores respective IDs for the composite application and a respective artifact. In this database also a subscription tag is stored which is checked in order to be sure to be obliged or not to notify the composite application about the newly updated artifact. Here, it can be assumed that if the subscription tag is set, then such obligation exists and a respective notification will be send from component 28 to the instantiation component 21 of portal 10. In this notification method the necessary IDs are used by the notification method.

Then, in a step 530 a business user or a portal administration user can decide whether or not to adopt the new artifact. In case they do adopt the new one, the new version of the artifact is downloaded, step 540, from the artifact registry 32 to the instantiation component 21 and will be stored in the artifact registry 18.

FIG. 6A and 6B illustrate the control flow of the most important steps of a preferred embodiment of the inventional method, when automatically creating an instance of a composite application using artefacts discovered and stored locally according to FIG. 4.

In a first step 610 a certain template denoted as template X is instantiated according to prior art, in a sequence of steps 620 to 670.

In a first step of the instantiation the lookup component 42 is invoked from the template. Then, in a step 620 the different components which are comprised of the template X are identified. A sample component may for example be the IBM portal WIKI BLOG component version 1.0. Next, in a further step 630 all identified components are looked up in the local list 27 of components. This is done according to prior art. Then, every component identified in the template which is decided in a decision 640 not being stored in the local component list 27 is looked up in a step 650 in the remote list 60 of components. Further, the binary code for each required component is requested and received from this remote list of components and is deployed locally in a step 660.

Thereafter all components required from template X are available for the instantiation component 21.

Thus, in a further step 670 an instance of the composite application is created based on the results and data obtained by the preceding steps. Then, the created instance is registered in the context of the portal, i.e. in appropriate context storage. In particular, the number of created instances, their initialization values and other information are registered.

A skilled reader will appreciate that all steps 610 to 670 can be performed fully automatically without human intervention. This is a significant advantage over prior art.

FIGS. 7a and 7b illustrate a further modification of the before described method. The basic procedure is the same as described before with reference to FIGS. 6a and 6b.

However, in a step 720 the meta-data stored in the template X are identified and are abstracted according to a predetermined taxonomy. So, in step 720 a component is analyzed to be required which provides a certain functionality, instead of an exact specification of the component as it was described with reference to FIGS. 6a and 6b. So in this further modification any component which provides BLOG functionality is accepted.

As a result of more search hits the look-up component looks up all components that have a pre-specified functionality and preferably performs a selection in order to obtain one or more special components which fit best the functionality requirement from step 720. It should be remarked that in this context prior art methods to instantiate a composite application fail if the component specified in step 620 does not exist in the local component storage. Here, in contrast, according to this special embodiment the choice of components is significantly enlarged and the components can be selected according to their scope of functionality instead to be constrained to satisfy the request with the exact component specified by name and version number, possibly vendor name, etc.

The rest of the creation procedure is the same as described before with reference to FIG. 6.

With further reference now to FIG. 8 further details are given telling a skilled reader how to manage the selection of artifacts and templates. This includes how to perform a parsing of the data source for a predetermined searched component according to a predetermined functionality specification.

The input and output parameters of components are described preferably via portal property broker WSDL fragments. This is done according to prior art, see for example: http://publib.boulder.ibm.com/infocenter/wpdoc/v6r0/in-
   dex.jsp b) the Web Service Definition Language (WSDL)
   at www.W3C see http://www.w3.org/TR/wsdl.

The properties of the components are defined via domain specific XML fragments. A domain may be defined via the XML namespace. The properties depend on a respective domain, see the samples given in FIGS. 8 and 9.

According to FIG. 8 a mail component having the business functionality of standard business mail uses a http server, is compliant to protocols SMTP and POPS, and offers LDAP functions.

Further, a calendar component uses a http server, uses a protocol "iCal" and has also LDAP functionality.

Further, a document library component uses again a http server, stores a minimum document size of 10 (arbitrarily defined units), and a maximum capacity of 100 units, and uses a folder structure of the depth of at least 100.

With respect to identification of appropriate component functionality, preferably Xpath queries are used to lookup components with the required meta-data. The query service called by the portal can be implemented as a Web service or a REST service, see http://en.wikipedia.org/wiki/REST Examples for queries for above referred sample components are given as follows:

For a mail component:
/mail/protocolls[protocoll=POP3]
/mail/protocolls[protocoll=IMAP]

For a document library component:
/doclib/size[min>20]

Of course, different syntax can be used as long as a different syntax is pre-defined by a respective standard.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The invention claimed is:

1. An electronic portal data processing system for automatically assisted generation of composite applications composed of instantiable components comprising:
    a computer with memory and at least one processor;
    a portal application executing in the memory of the computer by the at least one processor, the portal application receiving in a registry service of a portal system from multiple different sources over the Internet, different templates and artifacts and storing the different templates in a template catalog, and the different artifacts in an artifact registry, the template acting as a base for structure and function of a composite application constructed from a composition of selected ones of the different artifacts and invoking a template discovery service of the portal system to locate in the template catalog a specific template supporting a specified technical functionality, downloading the located specific template from the template catalog into a template registry of an instantiation component of the portal system, and locating meta-data within the downloaded template, the meta-data specifying predetermined functionality version compatibility and dependency information, the portal application performing:
    dynamically accessing the artifact registry and,
    parsing the artifact registry to identify the one or more components matching the predetermined functionality including version compatibility and dependency information,
    ranking the identified one or more components according to predetermined ranking criteria that has been adjusted to the composite application,
    selecting ones of the ranked identified one or more components and defining a list of the selected components from the ranking,
    storing at least a subset of the selected usable components in a local storage, and,
    automatically deploying the composite application from the selected usable components.

2. A computer program product for automatically assisted generation of composite applications, comprising a non-transitory computer useable storage medium storing computer readable program code that when executed on a computer causes the computer to perform the steps of:
    receiving in a registry service of a portal system from multiple different sources over the Internet, different templates and artifacts and storing the different templates in a template catalog, and the different artifacts in an artifact registry, the template acting as a base for structure and function of a composite application constructed from a composition of selected ones of the different artifacts;
    invoking a template discovery service of the portal system to locate in the template catalog a specific template supporting a specified technical functionality, downloading the located specific template from the template catalog into a template registry of an instantiation component of the portal system, and locating meta-data within the downloaded template, the meta-data specifying predetermined functionality version compatibility and dependency information, dynamically accessing the artifact registry and, parsing the artifact registry to identify the one or more components matching the predetermined functionality including version compatibility and dependency information, ranking the identified one or more components according to predetermined ranking criteria that has been adjusted to the composite application, selecting ones of the ranked identified one or more components and defining a list of the selected components from the ranking, storing at least a subset of the selected usable components in a local storage, and, automatically deploying the composite application from the selected usable components.

3. The electronic portal data processing system of claim 1, wherein the portal system comprises:

a composite application infrastructure component that manages application instances during runtime and also manages connection and data flow between instantiable components of the composite application; and, a templating application infrastructure component that manages templates.

4. The electronic portal data processing system of claim 3, wherein the templating application infrastructure component further includes a lookup component that interprets meta-data of a component description.

5. The electronic portal data processing system of claim 1, wherein the portal system is communicatively coupled to an artifact registry service.

6. The computer program product of claim 2, wherein the computer further performs the steps of:

instantiating a template; and, interpreting meta-data of a component description.

7. The computer program product of claim 2, wherein the computer further performs the steps of:

searching for suitable components in at least one of a local list of components and in a remote data collection by using a discovery component as a part of a remote service.

\* \* \* \* \*